US012474039B1

(12) United States Patent
Mishan

(10) Patent No.: US 12,474,039 B1
(45) Date of Patent: Nov. 18, 2025

(54) SECURITY FLOODLIGHT WITH SIMULATED SECURITY CAMERA OPERATION

(71) Applicant: E. MISHAN & SONS, INC., New York, NY (US)

(72) Inventor: Steven Mishan, New York, NY (US)

(73) Assignee: E. MISHAN & SONS, INC., New York, NY (US)

( * ) Notice: Subject to any disclaimer, the term of this patent is extended or adjusted under 35 U.S.C. 154(b) by 0 days.

(21) Appl. No.: 19/187,523

(22) Filed: Apr. 23, 2025

(51) Int. Cl.
*F21V 23/04* (2006.01)
*F21S 9/03* (2006.01)
*F21V 23/00* (2015.01)
*H05B 47/165* (2020.01)
*F21W 131/107* (2006.01)
*F21Y 103/10* (2016.01)
*F21Y 115/10* (2016.01)

(52) U.S. Cl.
CPC .......... *F21V 23/0471* (2013.01); *F21S 9/037* (2013.01); *F21V 23/003* (2013.01); *H05B 47/165* (2020.01); *F21W 2131/107* (2013.01); *F21Y 2103/10* (2016.08); *F21Y 2115/10* (2016.08)

(58) Field of Classification Search
CPC .... F21V 23/003; F21V 23/0471; F21S 9/037; H05B 47/165; G08B 15/008; G08B 5/36; G08B 5/38
USPC .......... 362/276, 802; 340/541; 348/152, 155
See application file for complete search history.

(56) References Cited

U.S. PATENT DOCUMENTS

2002/0140550 A1* 10/2002 Frattaroli ............. G08B 15/008 340/815.45
2012/0268604 A1* 10/2012 Tree ....................... H04N 7/183 340/541
2012/0307069 A1* 12/2012 Pierce .................. H04N 23/698 348/E7.085

* cited by examiner

*Primary Examiner* — Thomas M Sember
(74) *Attorney, Agent, or Firm* — Notaro, Michalos & Zaccaria P.C.

(57) ABSTRACT

A security floodlight has a light panel mounted in a housing for illuminating an area in proximity to the housing, an array of light emitting diodes (LEDs) mounted in the housing and arranged in a horizontal single row, and a controller configured activate the light panel based on an input signal and to sequentially activate each of the LEDs in the array of LEDs in a rotating sequence only when the light panel is not activated. The input signal may be received from a proximity sensor mounted in the housing that indicates the detection of movement in an area in close proximity to the security floodlight. The rotating sequence simulates operation of a low-light security camera by sequentially illuminating each LED in the array of LEDS in a rotating manner from a first end of the horizontal single row to a second end of the horizontal single row.

10 Claims, 3 Drawing Sheets

SECURITY FLOODLIGHT WITH SIMULATED SECURITY CAMERA OPERATION

FIELD

The present invention relates to security lighting, and more particularly, to a security floodlight that includes a series of light-emitting diodes (LEDs) arranged in a horizontal line, which activate in a rotating manner when the floodlight is off, simulating the operation of a low-light security camera.

BACKGROUND

Security floodlights are commonly used in residential, commercial, and industrial settings to deter potential intruders and provide illumination for security cameras. Many security systems integrate security cameras with floodlights to enhance monitoring and recording capabilities, especially in low-light conditions. However, installing actual security cameras can be costly and complex.

To create the appearance of a security camera and thus discourage criminal activity, decoy devices that simulate the appearance or behavior of cameras have been developed. One common feature of such decoy devices is the use of LEDs, often red, that mimic the "recording" indicator lights often seen on real security cameras.

However, there is a need for a security floodlight with an integrated decoy feature that simulates the behavior of a low-light security camera, specifically when the floodlight is not in use. This would enhance security, making it appear that the area is being monitored by a camera, even when a real security camera is not present or not in operation.

The present invention addresses this need by providing a security floodlight with a series of LEDs arranged in a horizontal line, which activate in a rotating manner when the floodlight is off, giving the appearance of a functioning low-light security camera.

SUMMARY

The present invention is directed to a security floodlight equipped with a series of light-emitting diodes (LEDs), preferably red, arranged in a horizontal line. These LEDs activate in a rotating manner, simulating the operation of a low-light security camera when the floodlight is off. When the floodlight is off, the red LEDs illuminate one by one in a rotating sequence, starting from one end of the horizontal line and moving to the other end. This creates a visual effect similar to the scanning or operation of a low-light security camera, serving as a decoy to deter potential intruders. When the floodlight is on, the red LEDs turn off, allowing the floodlight to function normally for illumination purposes. The decoy LED sequence is controlled by a simple circuit, ensuring that the floodlight and decoy function do not interfere with each other. This system provides an affordable and effective means to create the appearance of a functioning security camera, enhancing the deterrence effect of the floodlight even when no camera is present.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure describes a security floodlight with a decoy feature consisting of a horizontal line of LEDs, preferably red, that light up in a rotating sequence to simulate the operation of a low-light security camera. This feature is intended to deter potential intruders by creating the appearance of a video surveillance system, even when no camera is present or active.

Figure 1:
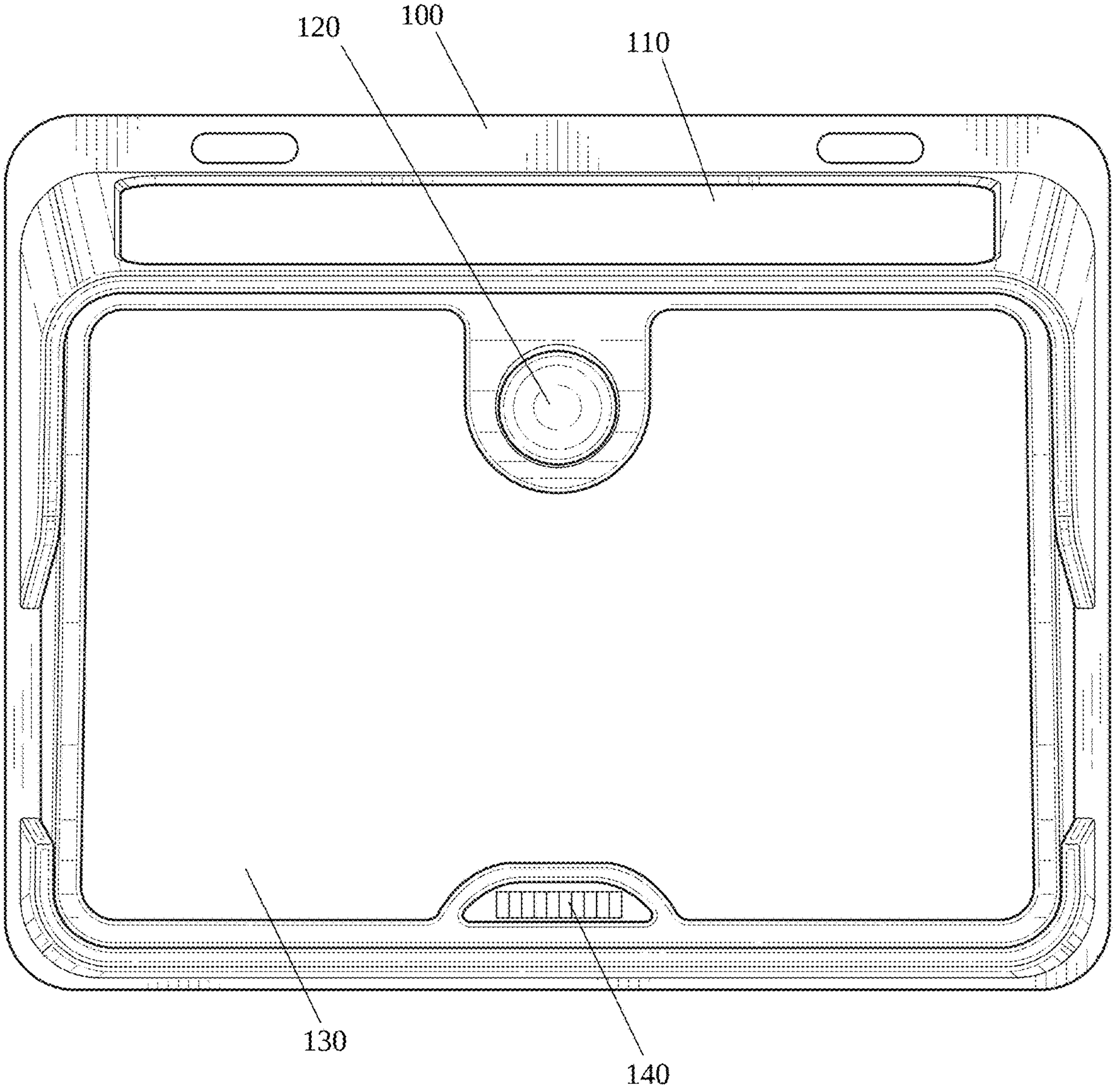
FIG. 1 is a front view of a security floodlight including a horizontal arrangement of LEDs according to the present disclosure.
Figure 2:
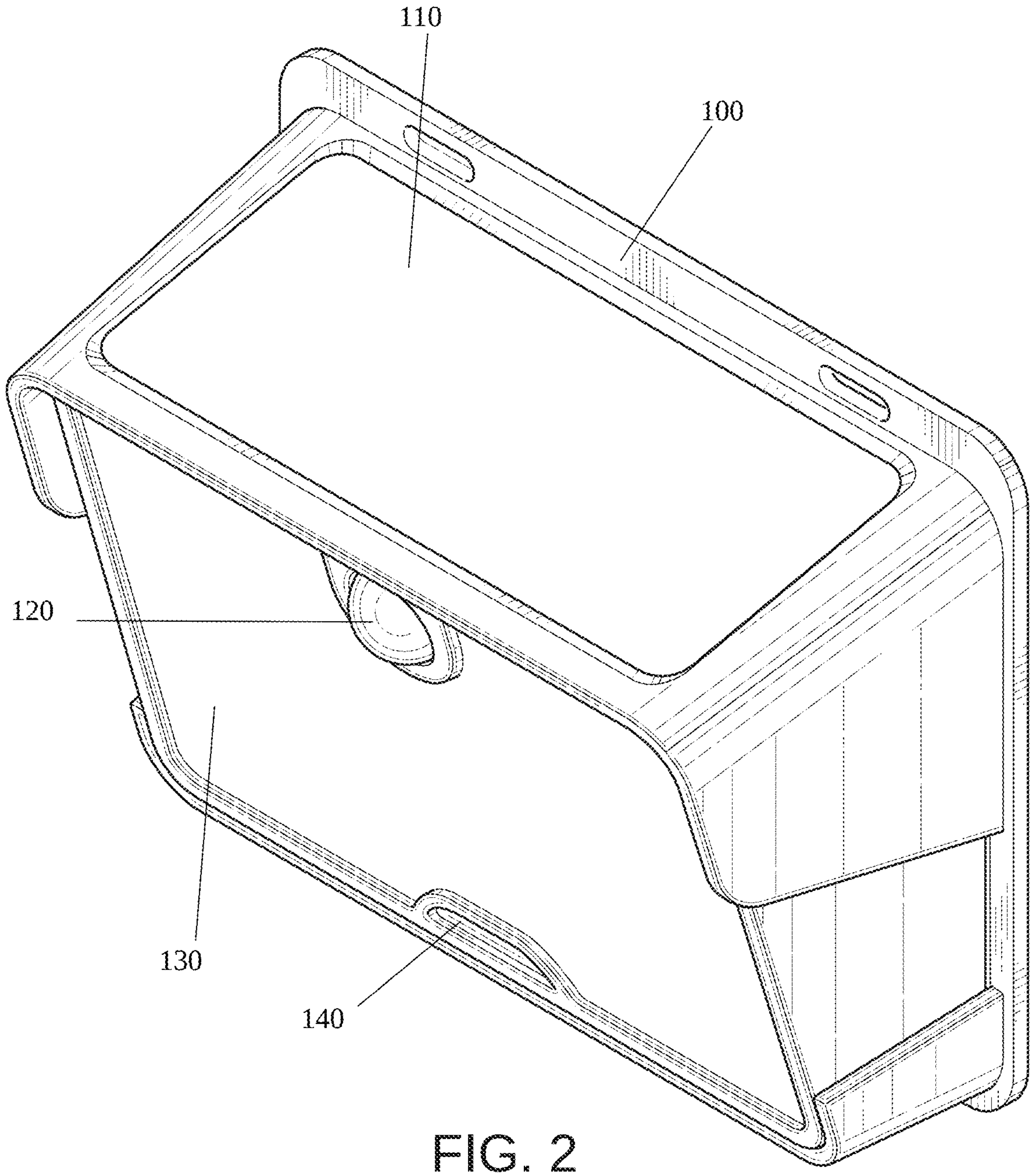
FIG. 2 is a right front side perspective view of the security floodlight of FIG. 1, illustrating the position of the LEDs relative to the main floodlight.

Referring now to FIGS. 1 and 2, a security floodlight 100 according to the present disclosure consists of a main housing that encloses the primary components, including a light panel 130 and an LED array 140. The light panel 130 is positioned to provide wide-area illumination of an area in proximity to the main housing when activated, while the LED array 140 is positioned in a horizontal line along a frontal area of the housing. The security floodlight 100 may also include a solar panel 110 for charging an internal battery and a proximity sensor 120 for detecting movement of an object in an area close to the security floodlight 100. In the alternative (or in addition), the security floodlight 100 may have a power cord for connection to an AC mains connector. Preferably, the LEDs in the LED array emit a red color and are arranged side-by-side in an evenly spaced horizontal line, creating a visual element similar to the recording indicator on traditional low-light security cameras. When the light panel 130 is off, the LEDs in the LED array 140 activate one at a time in a sequential rotating manner, giving the appearance of a camera scanning or recording the area in front of the security floodlight 100.

Figure 3A:
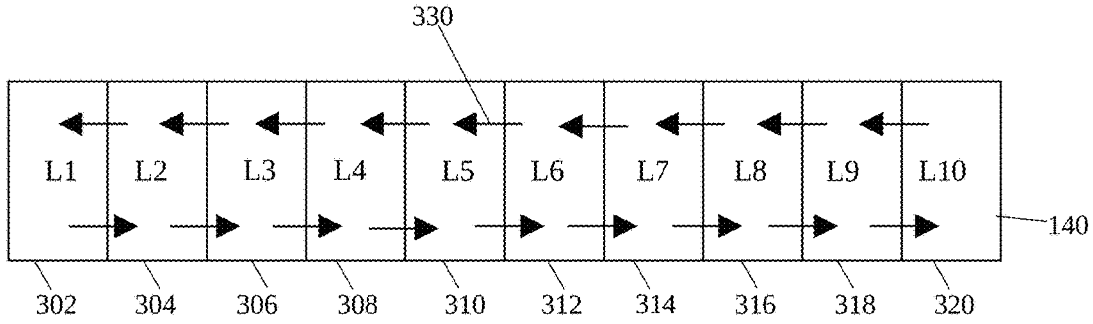
FIG. 3A is a diagram showing a first embodiment of a rotating activation sequence of the LEDs of the security floodlight of FIG. 1 from one end of the horizontal line to the other.
Figure 4:
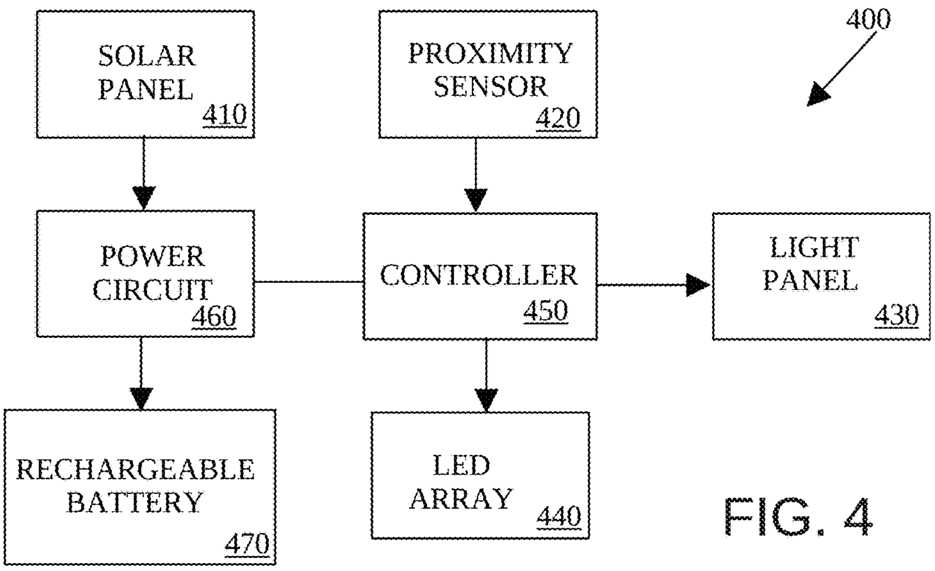
FIG. 4 is a schematic of a control circuit for the security floodlight according to the present disclosure.

Referring now to FIG. 3A, a key feature of this disclosure is the rotating activation sequence of the LEDs in the LED array 140. In FIG. 3A, ten LEDs 302, 304, 306, 308, 310, 312, 314, 216, 318, 320 are shown arranged side-by-side in a horizontal line. Although ten LEDs 302 to 320 are shown in FIG. 3A, the number of LEDs is arbitrary and satisfactory operation can be obtained with fewer LEDs, e.g., 5. When the light panel 130 is turned off (not activated), each of the ten LEDs 302 to 320 are sequentially illuminated from a first end of the horizontal line (e.g., LED L1 302) to a second end of the horizontal line (e.g., LED L10 320), based on signals from the controller 450 (FIG. 4). This illumination pattern creates a smooth walking or rotating effect from the first end to the second end. The illumination pattern then reverses, moving from the second end of the horizontal line to the first end thereof. This rotation, shown by the arrows 330 in FIG. 3A, mimics the behavior of a camera panning or scanning, making it appear as though a camera is monitoring the area. The illumination of the LED array 140 in the manner continues as long as the light panel 130 is not activated, creating a continuous decoy effect. In a further embodiment, the LED array 140 may only be operated in this manner when the light panel 130 is not activated and when it has been detected, via the solar panel 110, that the security floodlight 100 is in dark conditions, e.g., at night.

Figure 3B:
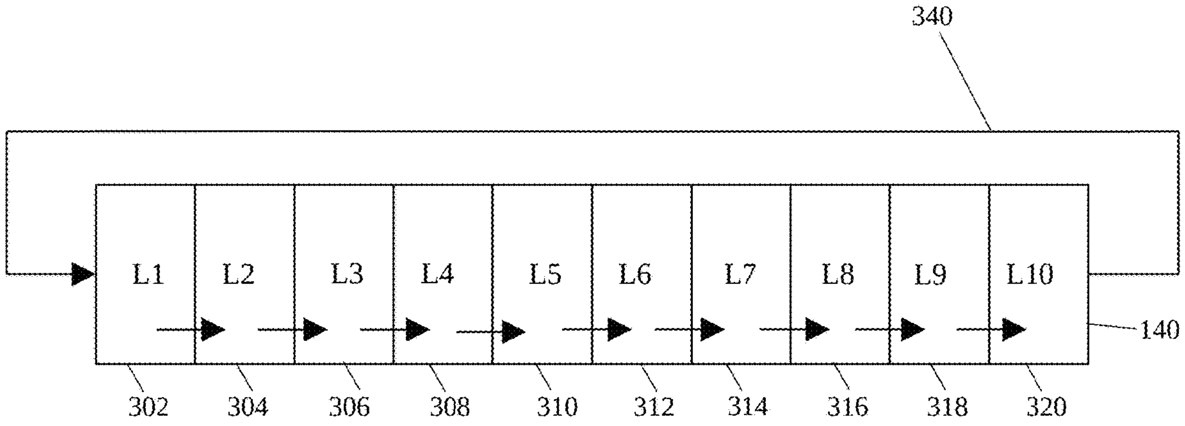
FIG. 3B is a diagram showing a second embodiment of a rotating activation sequence of the LEDs of the security floodlight of FIG. 1.

Referring now to FIG. 3B, an alternative embodiment is shown for a second mode of operation of the LED array 140. In FIG. 3B, when the light panel 130 is turned off (not activated), each of the ten LEDs 302 to 320 are continually sequentially illuminated from a first end of the horizontal line (e.g., LED L1 302) to a second end of the horizontal line (e.g., LED L10 320), as shown by the arrow 340 in FIG. 3B, based on signals from the controller 450 (FIG. 4). As with the FIG. 3A mode of operation, the illumination of the LED array 140 in the manner continues as long as the light panel 130 is not activated, creating a continuous decoy effect. Also as with the FIG. 3A mode of operation, in a further embodiment, the LED array 140 may only be operated in this manner when the light panel 130 is not activated and when it has been detected, via the solar panel 110, that the security floodlight 100 is in dark conditions, e.g., at night.

The security floodlight 100 may activate the light panel 130 based on a number of different inputs. In one mode of operation, the light panel 130 may be activated based on a manual switch. In addition (or in the alternative), the light panel 130 may be activated based on an input from the proximity sensor 120. Further, the light panel 130 may only be activated when the security floodlight 100 detects dark conditions. Preferably, the LED array 140 is not activated when the light panel 130 is activated, ensuring the light panel 130 provides full illumination without interference from the LED array 140. It may also be difficult to see the LED array 140 when the light panel 130 is activated. Once the security floodlight 100 deactivates the light panel 130 (e.g., based on a fixed period of time in which no input is received from the proximity sensor 120), the LED array 140 is reactivated to show the rotating sequence that simulate security camera operation.

Referring now to FIG. 4, a block diagram 400 of the control circuitry for security floodlight 100 is shown. A controller 450 is coupled to a proximity sensor 420, a light panel 430, an LED array 440, and a power circuit 460. The power circuit 460 is coupled between a solar panel 410 and a rechargeable battery 470 to manage charging of the battery. The power circuit 460 may provide controller 450 with a signal indicating whether or not the solar panel 410 is currently generating electricity—giving an indication that the security floodlight 100 is in day-time conditions or night-time conditions. The rechargeable battery 470 is also coupled via a connection not shown to provide power to the light panel 430 and the LED array 440. As discussed above, the security floodlight 100 may also be (or alternatively be) powered via an AC mains connection as known in the art. In operation, controller 450 provide signals to activate the LED array 440 in the sequential manner discussed above whenever the light panel 430 is not activated and provides a signal to deactivate the LED array 440 whenever the light panel 430 becomes activated (e.g., upon receipt of a signal from proximity sensor 420). Furthermore, the controller 450 may only activate the light panel 430 and the LED array 440 in low-light (night-time) conditions.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A security floodlight, comprising:

a light panel mounted in a housing for illuminating an area in proximity to the housing;

an array of light emitting diodes (LEDs) mounted in the housing and arranged in a horizontal single row; and a controller configured activate the light panel based on an input signal and to sequentially activate each of the LEDs in the array of LEDs in a rotating sequence only when the light panel is not activated.

2. The security floodlight of claim 1, wherein the input signal is received from a proximity sensor mounted in the housing that indicates detection of movement in an area in close proximity to the security floodlight.

3. The security floodlight of claim 1, wherein the input signal is received from a manual switch.

4. The security floodlight of claim 1, wherein the rotating sequence simulates operation of a low-light security camera by sequentially illuminating each LED in the array of LEDS in a rotating manner from a first end of the horizontal single row to a second end of the horizontal single row.

5. The security floodlight of claim 4, wherein the rotating sequence consists of continuously sequentially activating each LED in the array of LEDS one at a time from the first end of the horizontal single row to the second end of the horizontal single row, and then from the second end of the horizontal single row to the first end of the horizontal single row.

6. The security floodlight of claim 4, wherein the rotating sequence consists of continuously sequentially activating each LED in the array of LEDS one at a time from the first end of the horizontal single row to the second end of the horizontal single row.

7. The security floodlight of claim 1, wherein each of the LEDs in the array of LEDs is a red LED.

8. The security floodlight of claim 1, wherein the array of LEDs includes five LEDs.

9. The security floodlight of claim 1, wherein the controller is configured to receive a signal indicating that the security floodlight is in low light conditions.

10. The security floodlight of claim 9, wherein the controller is configured to only activate the array of LEDs upon receipt of the signal indicating that the security floodlight is in low light conditions.

* * * * *